United States Patent
Poincenot

[11] 3,820,234
[45] June 28, 1974

[54] MACHINING CENTER WITH AUTOMATIC TOOL-CHANGER

[75] Inventor: Rene Poincenot, Paris, France

[73] Assignee: Societe Anonyme dite: Ratier-Forest, Paris, France

[22] Filed: Dec. 6, 1971

[21] Appl. No.: 205,011

[52] U.S. Cl. ............................................. 29/568
[51] Int. Cl. ......................................... B23q 3/157
[58] Field of Search ............................ 29/568, 26 A

[56] References Cited
UNITED STATES PATENTS

| | | | |
|---|---|---|---|
| 3,161,951 | 12/1964 | Anthony | 29/568 |
| 3,339,273 | 9/1967 | Knosp | 29/568 |
| 3,541,677 | 11/1970 | Fiegler | 29/568 |
| 3,591,920 | 7/1971 | Brainard et al. | 29/568 |
| 3,691,655 | 9/1972 | Kurimoto et al. | 29/568 |

FOREIGN PATENTS OR APPLICATIONS 1,240,282  7/1971  Great Britain

Primary Examiner—Andrew R. Juhasz
Assistant Examiner—Z. R. Bilinsky
Attorney, Agent, or Firm—Holman & Stern

[57] ABSTRACT

Some conventional machining centers with automatic tool changer have a rotary tool-carrying spindle mounted in a headstock which is movable up and down a column while a tool magazine is provided with tool storage sockets the axes of which are parallel with the spindle axis. The tool change system comprises a tool change arm with two grips for replacing a tool in the spindle by another tool withdrawn from the magazine. The tool change system is located in immediate proximity to the tool magazine so that each time the tools have to be interchanged, it is necessary for the headstock to be moved away from its work position to a location close to the tool magazine and thereafter it has to be moved again back to its work position. Such movements of the headstock are time wasting all the more because the headstock is generally a very heavy member. This is detrimental to the efficiency of the machine and to the accuracy of the work being carried out. In order to remove such drawbacks the tool change system disclosed comprises a tool transfer unit which is vertically movable on a tower located between the magazine and the vertical path of travel of the headstock and which carries a tool change arm capable of reaching the spindle and the magazine. Thus the tool transfer unit takes the tools from the spindle to the magazine and back from the magazine to the tool spindle without any need for the headstock to be moved away from and back to its working position.

7 Claims, 8 Drawing Figures

MACHINING CENTER WITH AUTOMATIC TOOL-CHANGER

BACKGROUND OF THE INVENTION

The present invention relates to machining centers having a horizontal rotary tool-carrying spindle and automatic tool changer, of the type comprising a column with vertical slideways, a headstock movable on the slideways of the column, a horizontal rotary tool-carrying spindle carried by said headstock, a tool magazine with tool storage sockets the axes of which extend in directions parallel with the spindle axis, and a tool transfer unit which comprises a tool change arm with two grips for taking the tools out of and back into the magazine and the tool-carrying spindle, the tool change arm being capable to swivel and to shift along its axis which is parallel with the axes of the spindle and of the magazine tool storage sockets.

In conventional machining centers of this type, the tool transfer unit moves in immediate proximity to the tool magazine, so that each time a tool has to be changed, it is necessary for the headstock to leave its work position in order to be positioned nearer to the magazine and to move back to its work position after completion of the tool change. Such a requirement has a number of drawbacks; actually the up and down movements of the headstock which is a very heavy member are time wasting and detrimental to the efficiency of the machine, even though they are carried out at the so-called quick speed. Furthermore, it is always detrimental, from the point of view of accuracy, to carry out a plurality of machining operations upon a workpiece if it is necessary to shift the headstock after each operation and then to bring it back to its original work position.

SUMMARY OF THE INVENTION

The object of the present invention is to provide a machining center of the type involved which has not the aforesaid drawbacks of conventional machines.

To this aim, a machining center according to the invention is characterized broadly in that the tool change arm is carried by a tool transfer unit movable vertically on a tower located between the column and the tool magazine, the machining center further comprising means capable to impart quick speed movements to the transfer unit on the tower.

By virtue of this particular arrangement, when a tool has to be changed in the machine spindle, the movable tool transfer unit is moved successively level with the tool-carrying spindle and with the tool magazine, so that the headstock may be maintained in its work position and, therefore, all the drawbacks related to a displacement of the headstock between two machining steps upon a workpiece are eliminated.

In one particular embodiment wherein the headstock-carrying column is resting on a bed through a saddle the under face of which is slidably mounted on horizontal slideways of the bed, while its upper face is provided with horizontal slideways extending in directions at right angles to the slideways of the under face of the saddle and supporting the column, the tool transfer unit-carrying tower is slidably mounted on slideways which are fixed with respect to the column-carrying saddle and parallel with the slideways on the upper face of said saddle, and the machining center further comprises means capable to impart quick speed movements to the tower on its slideways.

Thus, the tool transfer unit is adapted to move up and down the tower which is itself capable to move horizontally in the same direction as the column. It is capable, therefore, of being positioned against the headstock in a position suitable for changing a tool in the spindle without the necessity of moving not only the headstock but also the column which is a member still heavier than the headstock.

The foregoing and other objects of this invention which will become more fully apparent from the following detailed description, may be achieved by means of the examplifying apparatus depicted in and set forth in this specification in connection with the accompanying drawings, in which:

DETAILED DESCRIPTION OF A PREFERRED EMBODIMENT

Figure 1:
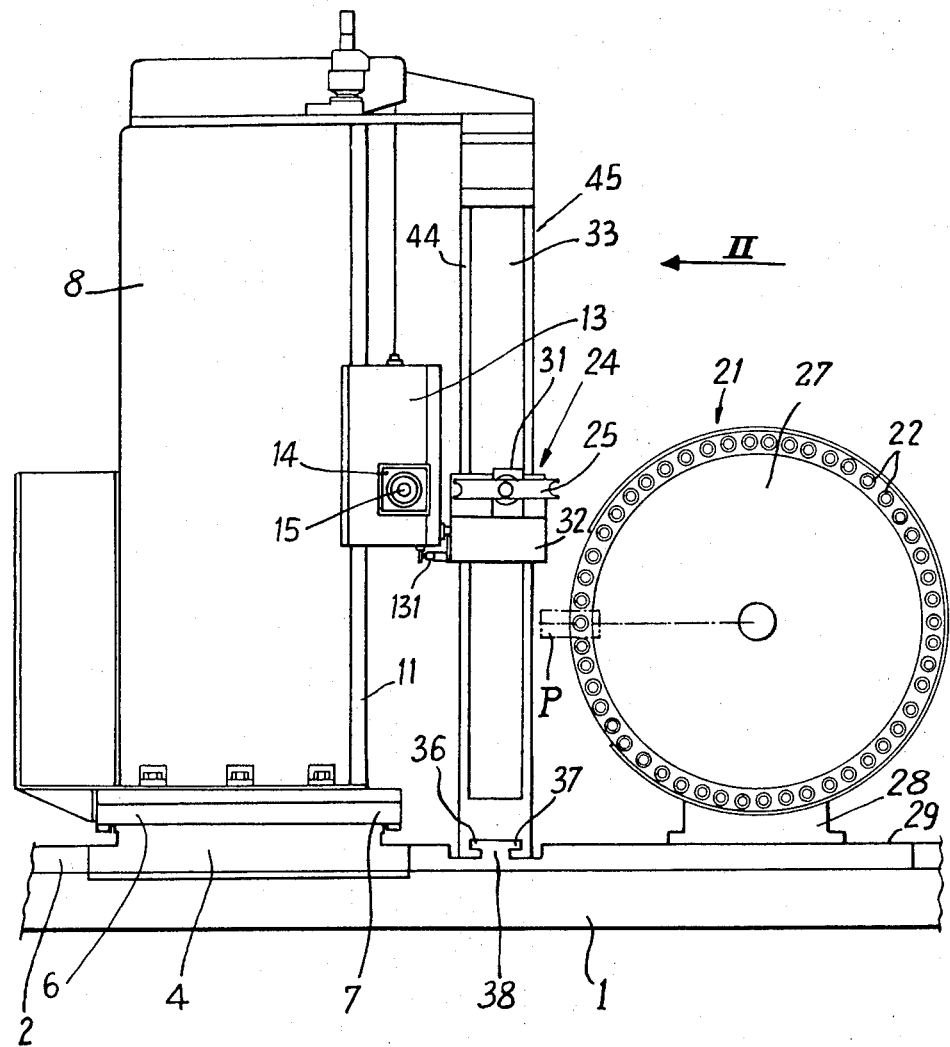
FIG. 1 is an elevational view of the main parts of the machining center.
Figure 2:
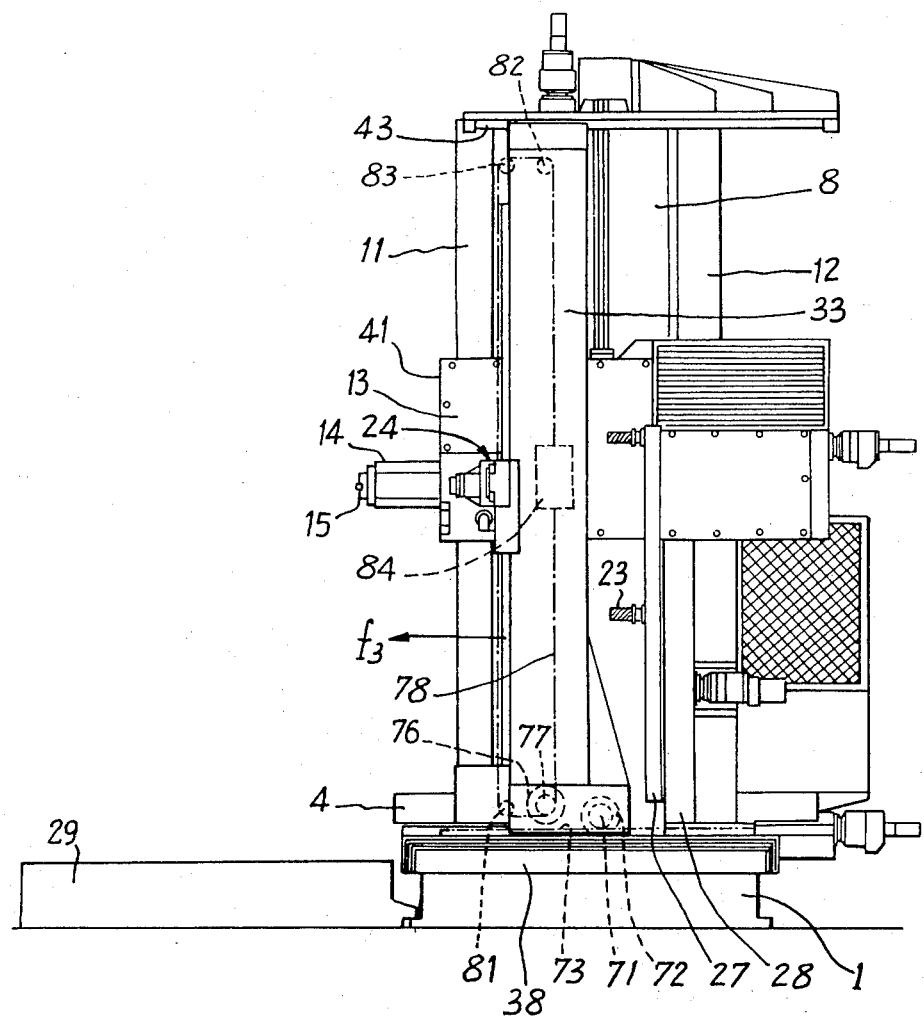
FIG. 2 is a side view as seen in the direction of arrow II in FIG. 1.

The machining center the main parts of which are represented in FIGS. 1 and 2 comprises essentially a bed 1 provided with horizontal slideways 2, a saddle 4 the under face of which is supported on the slideways 2 of the bed 1 and the upper face of which is provided with horizontal slideways 6, 7 extending in a direction at right angles to the slideways 2 of the bed 1, a column 8 movable on the slideways 6, 7 of the saddle 4 and itself provided with vertical slideways 11, 12, a headstock 13 movable on the slideways 11, 12 of the column 8, a prismatic square quill 14 slidably mounted in the headstock 13 in a horizontal direction parallel with that of the slideways 6, 7 of the saddle 4, a rotary tool-carrying spindle 15 longitudinally mounted in the quill 14, a magazine 21 with tool storage sockets 22 (see also FIG. 4) for receiving the tools such as 23 for instance, the axes of which extend in directions parallel with the axis of the spindle 15, and finally a tool transfer unit 24 comprising a swivelling tool change arm 25 for taking the tools into and out of the magazine 21 and the spindle 15. The main part of the magazine 21 is constituted by a rotary plate supported by a rest 28 secured onto a floor plate 29 which slides on the bed 1 together with the saddle 4.

Except for the tool transfer unit 24 which is the ground of the present invention, the control means for the movement of the members of the machine and the means for indexing the rotary plate 27 have not been described nor represented.

A workpiece is secured, for instance, onto the floor plate 29. The tool transfer unit 24 comprises essentially a carriage 31 movable horizontally (see also FIGS. 3 to 5) which carries the swivelling tool change lever 25, an apron 32 which supports the carriage 31, and a tower 33 on which the apron 32 is adapted to move up and down.

The tower 33 rests on horizontal slideways 36, 37 of a bed 38 formed by a portion of the floor plate 29, between the tool magazine 21 and the column carrying saddle 4, the slideways extending in a direction parallel with the direction of the slideways 6, 7 of the saddle 4 which carry the column 8.

The rotary plate 27 of the magazine is located in a vertical plane at right angles to the axis of the tool-carrying spindle 15 and it is retracted with respect to the saddle 4 (FIG. 2) by a distance sufficient not to hinder the operation of the machine. In the course of its movement on the bed 38, the tower 33 is able to move to and fro between the vertical plane of the magazine 21 and the vertical plane of the front face 41 of the headstock whatever the position of the column 8 on the saddle 4.

The tower 33 is guided at its upper portion, for instance by means of a slideway 43 secured to the column 8. The tower is constituted by a tubular member of a square cross section (FIG. 4) and carries two vertical slideways 44, 45 on which the apron 32 is adapted to move up and down and is guided, for instance, by longitudinal ball bearings 46, 47 and rollers 48, 49 and 51, 52.

Figure 3:
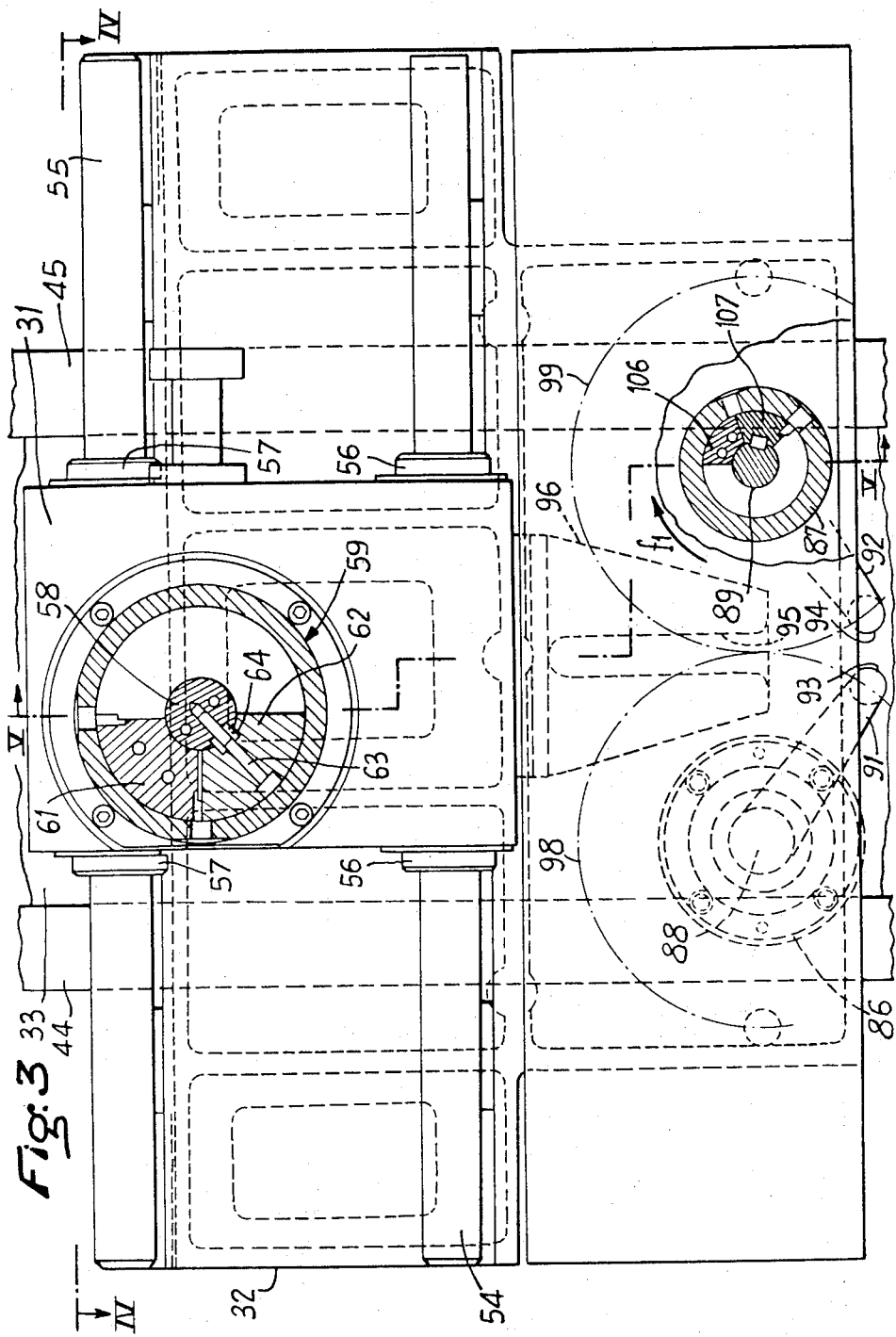
FIG. 3 is, on a larger scale, a front elevational view with portions broken away of the tool transfer unit as seen in FIG. 1, it being assumed that the tool change arm is removed.

The carriage 31 moves on cylindrical horizontal slideways 54, 55 secured to the apron 32, preferably through longitudinal ball bearings 56, 57 (see also FIG. 3).

The swivelling tool change arm 25 is secured to a rotary shaft 58 which is mounted in a pressure fluid device 59 secured to the front face of the carriage 31. There is shown a partition 61 (FIG. 3) which is secured in the casing of the pressure fluid device 59 and which is in the shape of a quarter of a cylinder and also a movable partition 62 (see also FIG. 5) which is secured by screws 63 and a key 64 to the shaft 58 and which is also in the shape of a quarter of a cylinder, in such a manner that the movable partition 62 and shaft 58 as well as the tool change arm 25 may be imparted pivoting movements having an amplitude of 180°. Both chambers of the pressure fluid device on either side of the stationary partition 61 are fed with pressure fluid from a suitable distributor (not shown) through lines such as 66, 67.

The shifting movements of the tower 33 on its bed 38 are ensured by any suitable means diagrammatically represented in FIG. 2 as a toothed pinion 71 which is driven by a hydraulic motor 72 carried by the base of the tower and which meshes with a rack 73 secured to the bed 38. Quick up and down motion of the tool transfer unit 24 on the tower 33 is achieved by means of a hydraulic motor 76 having a toothed output pinion 77 meshing with an endless chain 78 which flexes also against detour rollers 81, 82, 83 and which is attached both to the apron 32 and to a counterweight 84 adapted to balance the weight of the tool transfer unit 24.

Figure 5:
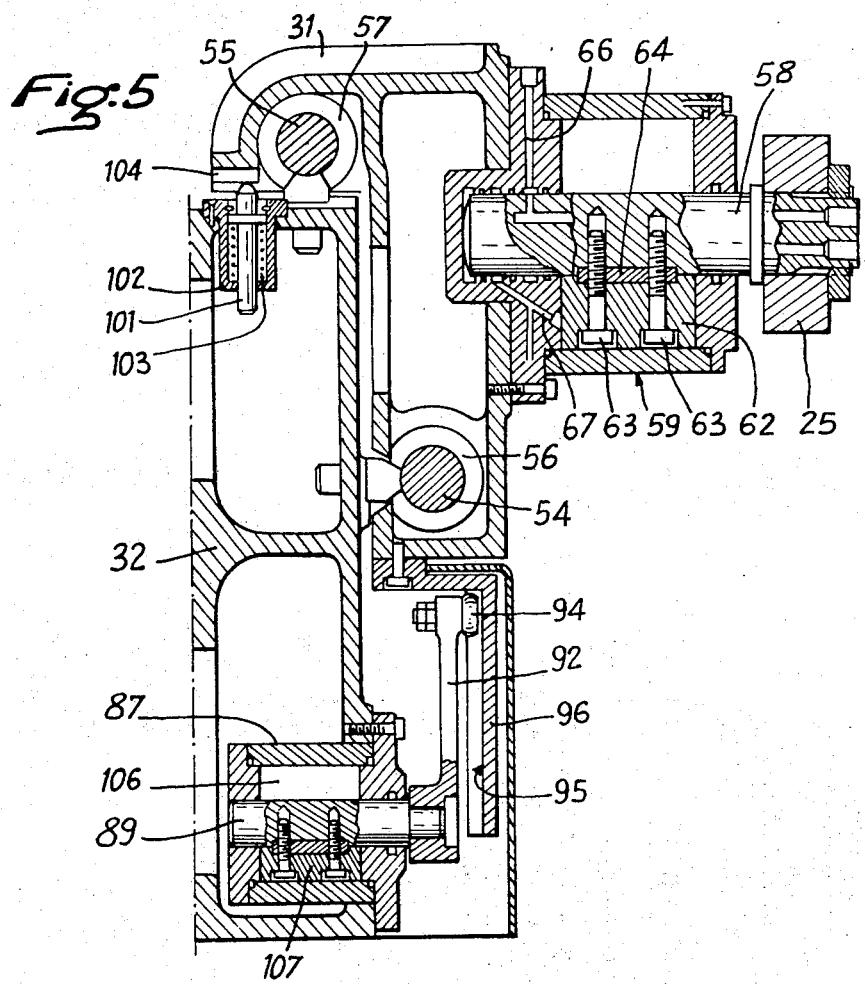
FIG. 5 is a vertical section made substantially along the broken line V—V in FIG. 3, it being assumed that the tool transfer carriage is moved to the right.

In the embodiment represented, the horizontal movements of the carriage 31 on the apron 32 (FIGS. 3 and 5) are ensured by a system which comprises two pressure fluid devices 86, 87 which have rotary shafts 88, 89 carrying respectively two arms 91, 92 with rollers 93, 94 adapted selectively to engage a cam groove 95 which is cut in a leg 96 secured to the carriage 31 and which terminates in the plane of the axes of shafts 88, 89. Upon rotation of the shafts of the fluid pressure devices, the rollers 93, 94 describe circumferential arcs 98, 99 tangent to each other, and when the carriage 31 is located in its middle intermediate position, as shown in FIG. 1 or 3, the axis of the groove 95 extends through the contact point of both circumferential arcs 98, 99. The carriage 31 is resiliently locked in this position by a plunger 101 which is adapted to slide in a casing 102 secured to the apron 32 and which is urged by a spring 103 into a locking notch 104 of the carriage 31 (FIG. 5).

By way of example, there is shown in FIG. 3, a stationary partition 106 and a rotor forming a movable partition 107 of the pressure fluid device 87. Starting from the middle intermediate position of the carriage 31 on the apron 32, upon the pressure fluid device 87 being fed in the direction which makes the arm 92 rotate clockwise (in the direction of the arrow $f1$), the roller 94 carried by said arm engages the groove 95 of the leg 96 of the carriage 31 and causes, therefore, movement of said carriage towards the right. A pivotal movement of the arm 92 in the reverse direction counterclockwise causes the carriage 31 to be brought back to its middle position. The other pressure fluid device 86 causes the carriage 31 to be moved toward the left and brought back to its middle position.

Figure 6:
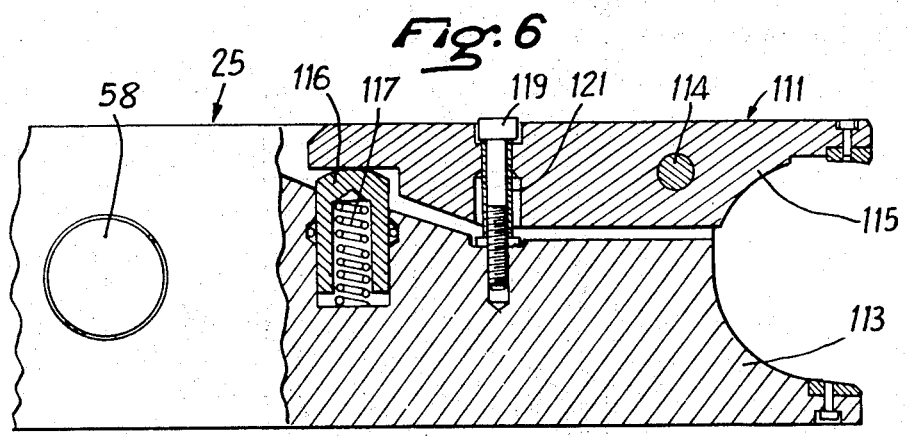
FIG. 6 is, on a larger scale, a vertical section made substantially along the line VI—VI of FIG. 4, and FIGS. 7 and 8 are two diagrams illustrating the steps of a tool change cycle respectively in two different positions of the headstock on the column.

Two tool grips 111, 112 (FIGS. 4 and 6) are carried respectively by the ends of the tool change arm 25. Both grips are identical and each comprises, for instance grip 111, a stationary jaw 113 on which is pivoted, by means of a pin 114, a movable jaw 115 urged toward closed position by a plunger 116 under the action of a spring 117. Both jaws 113 and 115 are recessed and their ends embrace an arc which is slightly in excess of 180° in order to grip firmly a cylindrical standard portion 118 (FIG. 4) of each tool. A screw 119 which maintains a tubular spacing part 121 limits, by the base of its head, the amplitude of the pivoting movement of the movable jaw under the action of the plunger 116. Preferably, the plunger 116 is additionally subjected to the action of a pressure fluid from a suitable distributor in order to provide for a firm clasping of the tools in the grip while the tool change arm 25 is moving.

Each tool such as 23 (FIG. 4) is positively retained in a tool storage socket 22 of the magazine by means of a transverse sliding bolt 124 having a slot 125 and urged by a spring 126. An enlarged portion 127 of the end of the tool gets hooked against the corresponding edge of the slot when the tool is pushed home into the socket. In order to let the tool out of the socket, the bolt 124 has to be pushed in a direction opposite that of the arrow $f2$; this is obtained by the action of a pusher member 128 secured to the carriage 31 and which, upon the carriage reaching the end of its travel, engages the bolt 124 simultaneously with the corresponding grip engaging the cylindrical portion 118 of the tool to be taken out of the socket.

Taking a tool out of and back into the magazine is always carried out with respect to the tool storage socket 22 of the magazine which is located level with the axis of the magazine, that is to say at the location indicated as at P in FIG. 1 and which will be called hereinafter tool loading and unloading station.

When a tool has to be changed in the spindle 15, the tool transfer unit 24 is brought into the vertical plane of the front face 41 (FIG. 2) of the headstock 13 and level with the tool-carrying spindle 15, this latter movement being always carried out through an approach directed upwardly in order to secure the best conditions for an accurate positioning of the tool transfer unit in vertical direction. To this end, the tool transfer unit, i.e., the apron 32 carries a feeler 131 adapted to engage the lower face of the headstock 13.

The machining center which has just been described is provided with a numerical control installation which will not be described in detail here. Description will be given only of the movements carried out to ensure a tool transfer.

The operating steps of a complete cycle for changing the tools is as follows:

It will be assumed that a tool (FIG. 4) is mounted in the machine spindle 15 and that it should be replaced by a tool 23 now in the magazine. The tool transfer unit 24 is located in its rest position, that is to say the tower 33 is located in the vertical plane of the magazine and the tool change arm 25 is level with the loading and unloading station P. This arm assumes a horizontal position and its grips 111 and 112 are both empty. The carriage 32 assumes its middle intermediate position.

Figure 4:
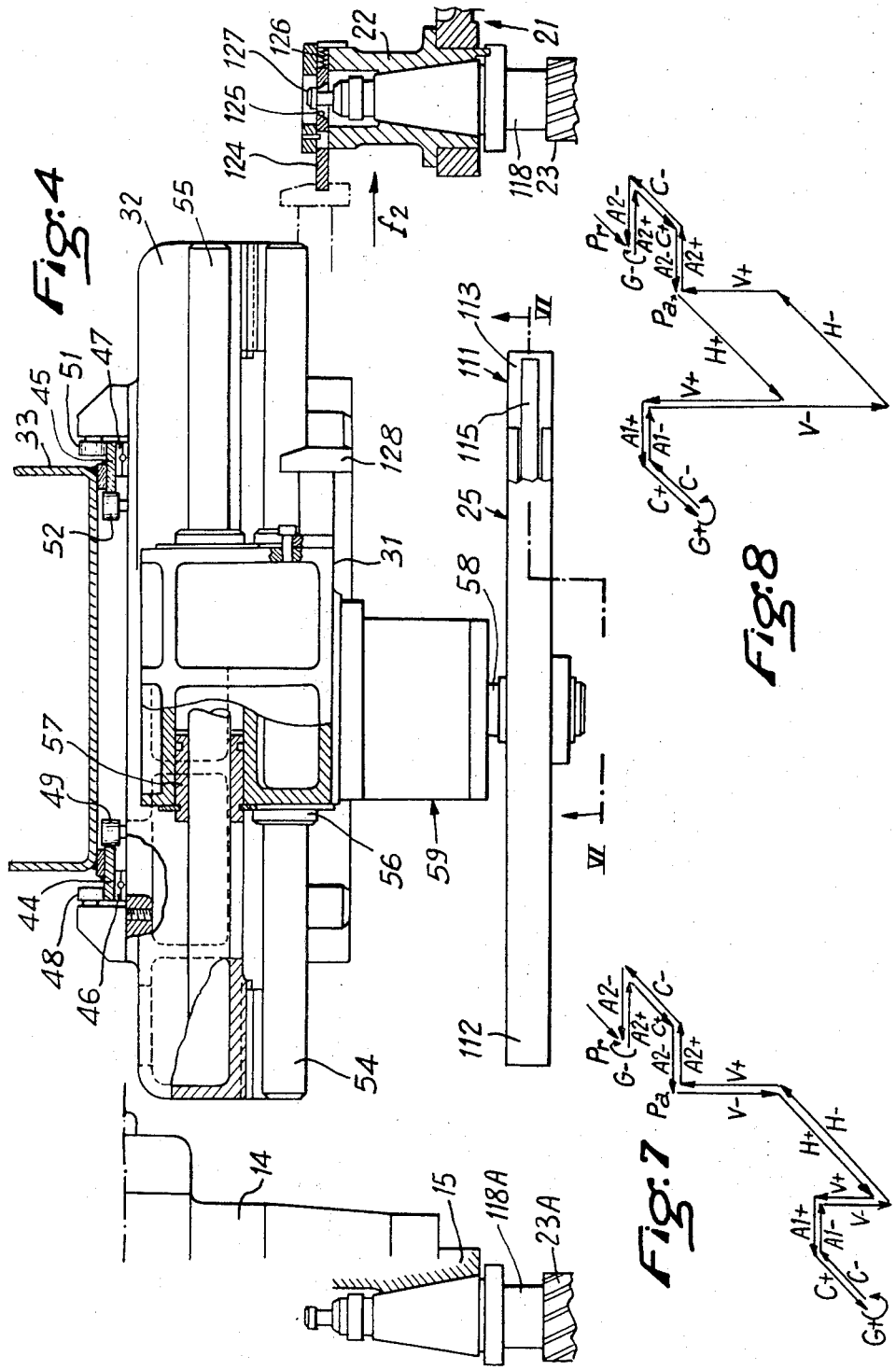
FIG. 4 is a horizontal section, with portions broken away, made along the line IV—IV in FIG. 3, on a somewhat smaller scale.

The tool changing cycle comprises three main parts, namely: preparing the new tool, interchanging the tools in the spindle, and putting the preceding tool back into the magazine, all the members being then returned to their initial rest position.

a. Preparing the new tool. This part of the cycle comprises the following steps:
Pivoting the magazine 21 (FIG. 1) by the suitable angle to bring the new tool 23 to the station P.
(The tool change arm 25 assumes its rest position level with station P. This position is indicated at Pr on the cycle diagram in FIG. 7).
Translation of the carriage 31 on the apron 32 towards the magazine under the action of the pressure fluid device 87 (symbol A2+ on the diagram of FIG. 7). At the end of the stroke, the grip 111 closes against the tool 23 while the bolt 124 is released by the pusher member 128 (FIG. 4).

Taking the tool out of the tool storage socket 22 of the magazine by a movement of the tower 33 in the direction of the arrow f3 (FIG. 2) under the action of the motor 72. The tool 23 is removed axially out of the socket 22 (symbol C+ of the diagram in FIG. 7).
Translation of the carriage 31 in the reverse direction toward its middle position on the apron 32 (symbol A2− of the diagram).

The tool transfer unit, now, is in its waiting position indicated at Pa in FIG. 7.

b. Interchanging the tools:
The spindle 15 is at a standstill, it is angularly positioned by means of any conventional suitable device such as, for instance, a heart shaped cam, and the quill 14 is retracted into the headstock 13.
Two cases are to be taken into consideration depending upon the spindle being located at a level lower or higher than the level of the loading and unloading station P, i.e., the level of the tool change arm 25 in its waiting position Pa.

A. First case:
The axis of the spindle 15 is located at a level lower than the level of the loading and unloading station P. The steps for changing the tool are as follows:
Lowering the apron 32 down to the foot of the tower 33 (symbol V− of the diagram in FIG. 7).

Shifting of the tower 33 on its sideways in the direction of the arrow f3 (FIG. 2) until the grip 112 of the arm 25 is located in the vertical plane of the portion 118A (FIG. 4) of the tool 23A mounted in the spindle 15. Stopping this movement is achieved, for instance, under the control of a feeler carried by the tower and engaging a complementary element carried by the column 8 (symbol H+ of the diagram in FIG. 7).
Upward movement of the apron 32 under the action of the motor 76 until the feeler 131 engages the lower face of the headstock 13 (symbol V+ in FIG. 7). The grip 112, now, is positioned level with the tool 23A.
Translation of the carriage 31 on the apron 32 towards the left under the action of the pressure fluid device 86. At the end of the stroke the empty grip 112 closes upon the tool 23A mounted in the spindle (symbol A1+ in FIG. 7).

(Here, the tool 23A is made loose in the spindle 15 by means of any suitable conventional device, not represented).

Extracting the tool 23A out of the nose of the spindle 15 by a translational movement of the tower 33 on its bed 38 in the direction of the arrow f3 (FIG. 2) under the action of the motor 76. This movement is completed upon the feeler 131 engaging the headstock (symbol C+ in FIG. 7); at this moment, the tool 23A is entirely positioned out of the spindle.
Swivelling the tool change arm 25 by 180° under the action of the pressure fluid device 59 (symbol G+ in FIG. 7).
Engaging the tool 23 into the spindle 15, the grip 111 now assuming the location previously occupied by the grip 112. This movement is obtained by a translation of the tower 33 in the direction reverse to that of the arrow f3 (FIG. 2) (symbol C− in FIG. 7).

(The tool 23 is moved into tight engagement with the spindle 15 by the aforesaid device and a signal indicating that the setting is completed authorises the cycle to be continued).

Translating the carriage 31 toward the right of the apron 32 for disengaging the grip 111 from the tool 23 (symbol A1− in the FIG. 7).
The carriage 31 is back to its middle position.

c. Movements back to rest position and putting the preceding tool back into the magazine.
Downward movement of the apron 32 down to the foot of tower 33 (symbol V−). Right from the beginning of this movement, a signal is being emitted to authorize resumption of the machining operation by means of the new tool 23.
Movement of the tower 33 back into the vertical plane of the magazine (symbol H− in FIG. 7).

This movement is stopped by a feeler carried by the tower and engaging the magazine.

Upward movement of the apron 32 on the tower up to the level of station P to bring the apron back into its waiting position Pa (symbol V+ in FIG. 7). A feeler carried by the apron 32 and engaging the magazine stops the movement upon the tool change arm reaching the level of its waiting position.

(In the meanwhile, that is to say from the beginning of the tool changing step proper, the magazine 27 has been indexed in such a manner that the socket 22 in which the preceding tool 23A is to be stored, is located at station P (FIG. 1).

Horizontal movement of the carriage 31 on the apron 32 toward the right to bring the tool 23A carried by the grip 112 into the axis of tha tool storage socket 22 adapted to receive it (symbol A2+ in FIG. 7).

Introducing the tool 23A into the socket 22 of the magazine by a backward movement of the tower 33 (symbol C− in FIG. 7). At the end of the stroke the enlarged portion 127 of the tool gets locked behind the edge of the bolt 124 (FIG. 4).

Moving the carriage 31 on the apron 32 toward the left for moving the grip 112 away from the tool 23A (symbol A2− in FIG. 7).

Swivelling the tool change arm 25 by 180° in the reverse direction (symbol G− in FIG. 7) in order that all the members assume again exactly their rest position Pr.

The cycle for changing a tool, now is completed.

B. Second case:

The axis of the spindle 15 is located at a level higher than that of the loading and unloading station P.

Subsequent to effecting the first step (a) for preparing the tool as already explained hereinabove, the following movements take place:

Translation of the tower 33 on its bed in the direction of the arrow f3 (FIG. 2) (symbol H+, this time on the diagram in FIG. 8).

Upward movement of the apron 32 on the tower 33 (symbol V+ in FIG. 8) under the same conditions as in the first case hereinabove described.

The cycle is then continued under the same conditions as in the first case hereinabove described in detail.

It will be ascertained that, from the waiting position, the tool transfer unit has not first been moved down to the foot of the tower as in the first case, since the spindle was located at a higher level. Thus, time has been spared by avoiding useless downward movement and upward movement.

Moreover, it should be pointed out that the feeler 131 is always operating upwardly, that is to say under the same condition, whatever may be the height of the spindle with respect to the magazine, which enhances an accurate vertical positioning of the tool transfer unit.

Of course, the invention is not limited to the embodiment described and represented which was given solely by way of example, many modifications may be adapted according to the applications contemplated without departing from the scope of the invention.

What I claim is:

1. A machining center comprising:

a base member;

a vertical column having vertical slideways and carried by said base member;

a headstock slidably movable on the vertical slideways of said column;

a horizontally disposed tool-carrying spindle rotatably mounted in said headstock;

a tool magazine having tool-storage sockets the axes of which are parallel to the axis of said spindle;

a tower having vertical slideways and movably mounted on a horizontal slideway on said base member said horizontal slideway having an end located between said column and said magazine so that said tower is slidable in a direction parallel to the axis of said tool-carrying spindle between said column and said tool magazine;

an apron movably mounted on the vertical slideways of said tower;

tool transfer means mounted on said apron and comprising a tool-change arm which is mounted so as to be swivellable about an axis parallel to said axis of said tool-carrying spindle, said tool-change arm having two grips each adapted to clasp a tool;

means for imparting said sliding movement to said tower;

means for imparting movement to said apron on the vertical slideways of said tower, whereby during respective operations of said tool transfer means a first tool may be transferred from said tool magazine in one of said two grips and a second tool may be transferred from said tool carrying spindle in the other of said two grips, the first tool being inserted into said tool-carrying spindle by the first grip and the second tool placed into one of said tool storage sockets of said tool magazine by the other of said two grips.

2. A machining center as defined in claim 1, comprising further longitudinal slideways parallel with the axis of said tool carrying spindle, said column being movable on said further longitudinal slideways.

3. A machining center as defined in claim 1, further comprising a bed with horizontal longitudinal slideways at right angles to the axis of said spindle, said column, said magazine and said tower being movable in unison on said horizontal longitudinal slideways of said bed.

4. A machining center as defined in claim 3, further comprising a saddle with lower slideways in engagement with said bed slideways and upper slideways at right angles to said lower slideways, said column having lower horizontal slideways in engagement with said upper slideways of said saddle for supporting said column, said lower horizontal slideways of said column being parallel with the axis of said spindle.

5. A machining center as defined in claim 1, wherein said apron is engaged on said vertical slideways of said tower and has horizontal slideways at right angles to the axis of said tool carrying spindle, and a carriage movable on said horizontal slideways of said apron, said tool change arm being mounted on said carriage, said machining center further comprising power means for moving said carriage on said apron, said power means comprising two pressure fluid power devices carried by said apron, each of said power devices having a rotor carried by a horizontal shaft parallel with the axis of said tool change arm, both of said shafts of said rotors being located in a single horizontal plane, said carriage having a leg with a vertical groove terminating into said plane and each of said rotor shafts carrying a rotor arm of given length with a roller selectively engagable into said groove, the distance between the axes of said rotors being equal to the sum of the lengths of said arms, said carriage and said apron having respectively complementary resilient locking elements for resiliently locking said carriage in its middle intermediate position on said apron.

6. A machining center comprising:

a base member;

a vertical column having vertical slideways and carried by said base member;

a headstock slidably movable on the vertical slideways of said column;

a horizontally disposed tool-carrying spindle rotatably mounted in said headstock;

a tool magazine having tool storage sockets the axes of which are parallel to the axis of said spindle;

a tower having vertical slideways and movably mounted on said base member so that said tower is slidable in a direction parallel to the axis of said tool-carrying spindle between said column and said tool magazine, said vertical column and said tool magazine being located on opposite sides of the horizontal path of travel of said tower;

an apron movably mounted on the vertical slideways of said tower;

tool transfer means mounted on said apron and comprising a tool-change arm which is mounted so as to be swivellable about an axis parallel to said axis of said tool-carrying spindle, said tool-change arm having two grips each adapted to clasp a tool;

means for imparting said sliding movement to said tower;

and means for imparting movement to said apron on the vertical slideways of said tower, whereby during respective operations of said tool transfer means a first tool may be transferred from said tool magazine in one of said two grips and a second tool may be transferred from said tool carrying spindle in the other of said two grips, the first tool being inserted into said tool-carrying spindle by the first grip and the second tool placed into one of said tool storage sockets of said tool magazine by the other of said two grips.

7. A machining center comprising:

a base member;

a vertical column having vertical slideways and carried by said base member;

a headstock slidably movable on the vertical slideways of said column;

a horizontally disposed tool-carrying spindle rotatably mounted in said headstock;

a tool magazine having tool-storage sockets the axes of which are parallel to the axis of said spindle;

a tower having vertical slideways and movably mounted on said base member so that said tower is slidable in a direction parallel to the axis of said tool-carrying spindle between said column and said tool magazine;

an apron movably mounted on the vertical slideways of said tower said apron having horizontal slideways disposed at right angles to said axis of said tool-carrying spindle;

a carriage movably mounted on the horizontal slideways of said apron;

a tool change arm mounted on said carriage so as to be swivellable about an axis parallel to said axis of said tool-carrying spindle;

two grips mounted on said tool change arm each grip being adapted to clasp a tool;

means for imparting said sliding movement to said tower;

means for imparting vertical movement of said apron on said tower;

means for moving said carriage on said horizontal slideways of said apron;

and means for swivelling said tool change arm, whereby a tool may be transferred from said tool-carrying spindle in one of said grips and placed into one of said tool storage sockets of said tool-magazine and a tool may be transferred from one of said tool storage sockets of said magazine in the other one of said grips and inserted into said tool-carrying spindle.

* * * * *

UNITED STATES PATENT OFFICE
CERTIFICATE OF CORRECTION

Patent No. 3820234      Dated June 28, 1974

Inventor(s) Rene Poincenot

It is certified that error appears in the above-identified patent and that said Letters Patent are hereby corrected as shown below:

[32] Foreign Priority Document

French No. 7045523 filed December 17, 1970

Signed and sealed this 3rd day of December 1974.

(SEAL)
Attest:

McCOY M. GIBSON JR.
Attesting Officer

C. MARSHALL DANN
Commissioner of Patents